(12) United States Patent
Tamaki (10) Patent No.: US 9,696,581 B2
(45) Date of Patent: Jul. 4, 2017

(54) LIQUID CRYSTAL DISPLAY DEVICE AND ELECTRONIC DEVICE

(71) Applicant: Japan Display Inc., Minato-ku (JP)

(72) Inventor: Masaya Tamaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 150 days.

(21) Appl. No.: 14/632,512

(22) Filed: Feb. 26, 2015

(65) Prior Publication Data

US 2015/0248039 A1   Sep. 3, 2015

(30) Foreign Application Priority Data

Feb. 28, 2014   (JP) ................. 2014-039027

(51) Int. Cl.
G02F 1/1335   (2006.01)

(52) U.S. Cl.
CPC .. *G02F 1/133553* (2013.01); *G02F 1/133504* (2013.01)

(58) Field of Classification Search
None
See application file for complete search history.

(56) References Cited

U.S. PATENT DOCUMENTS

| | | | | |
|---|---|---|---|---|
| 6,524,666 B1* | 2/2003 | Ichinose | ............ | C09K 19/3001 252/299.63 |
| 6,867,830 B1* | 3/2005 | Hirota | ............... | G02F 1/133553 349/96 |
| 2009/0059145 A1* | 3/2009 | Nishioka | ........... | G02F 1/133707 349/119 |
| 2012/0313906 A1 | 12/2012 | Tamaki et al. | | |
| 2013/0229603 A1* | 9/2013 | Tamaki | ............... | G02B 5/0236 349/113 |
| 2015/0109562 A1* | 4/2015 | Tamaki | ............. | G02F 1/133524 349/96 |

FOREIGN PATENT DOCUMENTS

| JP | 2004-302294 | 10/2004 |
|---|---|---|
| JP | 2012-255908 | 12/2012 |

OTHER PUBLICATIONS

U.S. Appl. No. 14/690,772, filed Apr. 20, 2015, Tamaki.

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a liquid crystal display device includes a polarizing layer, first and second substrate units, and a liquid crystal layer. The first substrate unit has first and second surfaces. The first surface is on the polarizing layer side. The second surface is on a side opposite to the first surface. The first substrate unit includes first and second pixel electrodes, and an opening region. The first and second pixel electrodes are disposed on the first surface. The second substrate unit is provided between the first substrate unit and the polarizing layer. The second substrate unit has third and fourth surfaces. The third surface is on the first substrate unit side. The fourth surface is on a side opposite to the third surface. The second substrate unit includes an opposing electrode on the third surface. The liquid crystal layer is provided between the first and third surfaces.

24 Claims, 5 Drawing Sheets

LIQUID CRYSTAL DISPLAY DEVICE AND ELECTRONIC DEVICE

CROSS-REFERENCE TO RELATED APPLICATIONS

This application is based upon and claims the benefit of priority from Japanese Patent Application No. 2014-039027, filed on Feb. 28, 2014; the entire contents of which are incorporated herein by reference.

FIELD

Embodiments described herein relate generally to a liquid crystal display device and an electronic device.

BACKGROUND

Liquid crystal display devices are used in various applications. It is desirable to increase the designability.

SUMMARY OF THE INVENTION

According to one embodiment, a liquid crystal display device is provided. The device includes a polarizing layer, a first substrate unit, a second substrate unit, and a liquid crystal layer. The first substrate unit has a first surface and a second surface. The first surface is on a side of the polarizing layer. The second surface is on a side opposite to the first surface. The first substrate unit includes a first pixel electrode, a second pixel electrode, and an opening region. The first pixel electrode and the second pixel electrode are light-reflective and disposed on the first surface. The opening region does not overlap the first pixel electrode and the second pixel electrode. The second substrate unit is provided between the first substrate unit and the polarizing layer. The second substrate unit has a third surface and a fourth surface. The third surface is on a side of the first substrate unit. The fourth surface is on a side opposite to the third surface. The second substrate unit includes an opposing electrode provided on the third surface. The opposing electrode is light-transmissive. The liquid crystal layer is provided between the first surface and the third surface. A first light is incident on the first substrate unit from the second surface and passes through the opening region and the liquid crystal layer. At least a portion of the first light is emittable from the fourth surface via the second substrate unit.

DETAILED DESCRIPTION

Embodiments of the invention will now be described with reference to the drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

Figure 1:
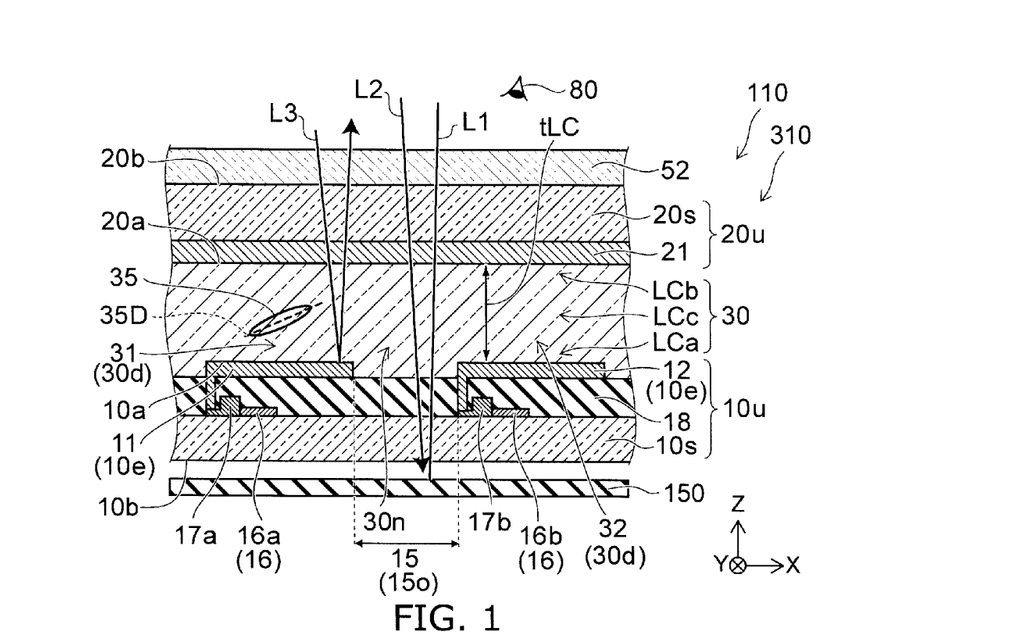
FIG. 1 is a schematic cross-sectional view illustrating a liquid crystal display device according to a first embodiment.

FIG. 1 is a schematic cross-sectional view illustrating a liquid crystal display device according to a first embodiment.

As shown in FIG. 1, the liquid crystal display device 110 according to the embodiment includes a polarizing layer 52, a first substrate unit 10u, a second substrate unit 20u, and a liquid crystal layer 30.

A direction from the polarizing layer 52 toward the first substrate unit 10u is taken as a Z-axis direction. One direction perpendicular to the Z-axis direction is taken as an X-axis direction. A direction perpendicular to the Z-axis direction and the X-axis direction is taken as a Y-axis direction.

For example, the polarizing layer 52 extends along the X-Y plane.

The first substrate unit 10u has a first surface 10a and a second surface 10b. The first surface 10a is the surface on the polarizing layer 52 side. The second surface 10b is the surface on the side opposite to the first surface 10a.

The first surface 10a and the second surface 10b intersect the Z-axis direction. In the example, the first surface 10a and the second surface 10b are parallel to the X-Y plane.

The first substrate unit 10u includes multiple pixel electrodes 10e (e.g., a first pixel electrode 11, a second pixel electrode 12, etc.). The multiple pixel electrodes 10e are disposed inside the first surface 10a. The multiple pixel electrodes 10e are light-reflective.

The first substrate unit 10u includes an opening region 15o. The opening region 15o does not overlap the first pixel electrode 11 and the second pixel electrode 12 (when projected onto the X-Y plane). In the example, the opening region 15o includes an inter-pixel region 15. The inter-pixel region 15 is the region between the first pixel electrode 11 and the second pixel electrode 12. The inter-pixel region 15 is the region between the multiple pixel electrodes 10e. As described below, an opening may be provided in the pixel electrode; and the opening may be included in the opening region 15o.

The second substrate unit 20u is provided between the first substrate unit 10u and the polarizing layer 52. The second substrate unit 20u has a third surface 20a and a fourth surface 20b. The third surface 20a is the surface on the first substrate unit 10u side. The fourth surface 20b is the surface on the side opposite to the third surface 20a. For example, the third surface 20a opposes the first surface 10a. The second substrate unit 20u includes an opposing electrode 21 (a common electrode). The opposing electrode 21 is provided on the third surface 20a. The opposing electrode 21 is light-transmissive.

The liquid crystal layer 30 is provided between the first surface 10a and the third surface 20a. A portion of the liquid crystal layer 30 is disposed between the opposing electrode 21 and the multiple pixel electrodes 10e. Another portion of the liquid crystal layer 30 is disposed between the opposing electrode 21 and the opening region 15o (e.g., the inter-pixel region 15) of the first substrate unit 10u.

The liquid crystal layer 30 includes pixel units 30d (e.g., a first pixel unit 31, a second pixel unit 32, etc.). The first pixel unit 31 is disposed between the first pixel electrode 11 and the second substrate unit 20u. The second pixel unit 32 is disposed between the second pixel electrode 12 and the second substrate unit 20u. The liquid crystal layer 30 further includes a non-pixel portion 30n. The non-pixel portion 30n is disposed between the second substrate unit 20u and the opening region 15o (e.g., the inter-pixel region 15).

The liquid crystal layer 30 includes, for example, a nematic liquid crystal. A liquid crystal 35 that is included in the liquid crystal layer 30 has a long-axis direction 35D (a director). The long-axis direction 35D of the liquid crystal 35 changes according to a voltage applied to the liquid crystal layer 30. In other words, the liquid crystal alignment of the liquid crystal layer 30 changes according to the voltage. For example, the effective birefringence (the retardation) of the liquid crystal layer 30 changes according to the change of the liquid crystal alignment. The change of the effective birefringence is converted into the brightness of the light by the polarizing layer 52. Thereby, a display is performed. The optical rotatory properties (the optical activity) may change according to the change of the liquid crystal alignment.

In the liquid crystal display device 110, a viewer 80 views the display of the liquid crystal display device 110 from the polarizing layer 52 side. The polarizing layer 52 is disposed between the viewer 80 and the first substrate unit 10u. The polarizing layer 52 side (the fourth surface 20b side) corresponds to the front side. The second surface 10b side corresponds to the backside. The liquid crystal display device 110 is, for example, a reflection-type display device.

For example, light (e.g., a third light L3) is incident on the liquid crystal display device 110 from the front side. The light passes through the polarizing layer 52, the second substrate unit 20u, and the liquid crystal layer 30 and is incident on the pixel electrodes 10e (e.g., the first pixel electrode 11). The third light L3 that is incident on the pixel electrodes 10e is reflected by the pixel electrodes 10e. The third light L3 that is reflected passes through the liquid crystal layer 30, the second substrate unit 20u, and the polarizing layer 52 and is emitted from the front side to the outside.

According to the voltage applied to the liquid crystal layer 30, the liquid crystal alignment of the pixel unit 30d (e.g., the first pixel unit 31) changes; and the optical characteristics (e.g., the effective birefringence, e.g., the retardation) of the pixel unit 30d change. The brightness of the third light L3 that passes through the polarizing layer 52 and is emitted to the outside changes according to the change of the optical characteristics. The brightness at the pixel unit 30d changes according to the voltage; and the display is performed.

For example, the potential difference between the first pixel electrode 11 and the opposing electrode 21 is set to a first voltage in a first state. At this time, the intensity of the third light L3 that passes through the polarizing layer 52 and the first pixel unit 31 of the liquid crystal layer 30 between the first pixel electrode 11 and the opposing electrode 21, is incident on the first pixel electrode 11, is reflected by the first pixel electrode 11, and passes through the first pixel unit 31 and the polarizing layer 52 is set to a first intensity.

The potential difference between the first pixel electrode 11 and the opposing electrode 21 is set to a second voltage in a second state. The second voltage is different from the first voltage. At this time, the intensity of a fourth light L4 that passes through the polarizing layer 52 and the first pixel unit 31 of the liquid crystal layer 30 between the first pixel electrode 11 and the opposing electrode 21, is incident on the first pixel electrode 11, is reflected by the first pixel electrode 11, and passes through the first pixel unit 31 and the polarizing layer 52 is set to a second intensity.

The first intensity is different from the second intensity. For example, the effective value (root-mean square value) of the second voltage is larger than the effective value (root-mean square value) of the first voltage. For example, the first state is an off-state. The second state is an on-state. For example, the first intensity is lower than the second intensity. In other words, for example, a normally dark (a normally black) display is performed. For example, the first intensity may be higher than the second intensity. In other words, for example, a normally bright (a normally white) display may be performed.

On the other hand, a first light L1 is incident on the first substrate unit 10u from the second surface 10b. The first light L1 passes through the opening region 15o (e.g., the inter-pixel region 15) and the liquid crystal layer 30. At least a portion of the first light L1 can be emitted from the fourth surface 20b via the second substrate unit 20u.

In the liquid crystal display device 110, the image of an object, etc., at the back surface is viewable through the opening region 15o (e.g., the inter-pixel region 15).

For example, a structural body 150 is provided on the backside. In other words, the first substrate unit 10u is disposed between the structural body 150 and the liquid crystal layer 30. The structural body 150 may contact the first substrate unit 10u. The structural body 150 may be separated from the first substrate unit 10u.

For example, the structural body 150 may be an electronic component. A mechanical component may be used. The structural body 150 may be a picture or a photograph. The structural body 150 is arbitrary. The light that is emitted from the structural body 150 can pass through the opening region 15o (e.g., the inter-pixel region 15).

The structural body 150 may emit light. In other words, the structural body 150 may emit the first light L1. The first light L1 that is emitted from the structural body 150 passes through the opening region 15o (e.g., the inter-pixel region 15).

The structural body 150 may be reflective. The light that is reflected by the structural body 150 may pass through the opening region 15o (e.g., the inter-pixel region 15).

As illustrated in FIG. 1, a second light L2 is incident on the second substrate unit 20u from the fourth surface 20b. The second light L2 is emitted from the second surface 10b via the liquid crystal layer 30 and the opening region 15o (e.g., the inter-pixel region 15). The second light L2 is incident on the structural body 150. The light of the second light L2 that is reflected by the structural body 150 is the first light L1. The first light L1 passes through the opening region 15o (e.g., the inter-pixel region 15).

In other words, external light may be incident on the structural body 150; and the light that is reflected by the structural body 150 may pass through the opening region 15o (e.g., the inter-pixel region 15).

Further, external light may be incident on the structural body 150 from the space between the first substrate unit 10u and the structural body 150. The light that is reflected by the structural body 150 passes through the opening region 15o (e.g., the inter-pixel region 15) and reaches the viewer 80.

The liquid crystal display device 110 may further include the structural body 150. The structural body 150 may be provided separately from the liquid crystal display device 110.

For example, an electronic device 310 according to the embodiment includes the liquid crystal display device 110 and the structural body 150.

In the embodiment, the structural body 150 is arbitrary. The first light L1 may be, for example, the light of a landscape.

In the liquid crystal display device 110 according to the embodiment, the display image due to the pixel electrodes 10e and the background image due to the light (the first light L1) passing through the opening region 15o (e.g., the inter-pixel region 15) can be provided. Thereby, a liquid crystal display device and an electronic device that have high designability can be provided.

In the example, the second substrate unit 20u further includes a second substrate 20s. The second substrate 20s is light-transmissive. The opposing electrode 21 is disposed between the second substrate 20s and the liquid crystal layer 30.

On the other hand, the first substrate unit 10u further includes a first substrate 10s, interconnects 16 (a first interconnect 16a, a second interconnect 16b, etc.), a first switching element 17a, a second switching element 17b, and an insulating layer 18.

The first pixel electrode 11 and the second pixel electrode 12 are disposed between the first substrate 10s and the liquid crystal layer 30. The first substrate 10s is light-transmissive.

The first switching element 17a (e.g., a transistor, a nonlinear resistance element, etc.) is provided between the first substrate 10s and the liquid crystal layer 30. The first switching element 17a is electrically connected to the first pixel electrode 11.

The first interconnect 16a is provided between the first substrate 10s and the liquid crystal layer 30. The first interconnect 16a is electrically connected to the first switching element 17a. For example, the first interconnect 16a is, for example, a signal line. For example, the signal line supplies a charge to the first pixel electrode 11. The supply of the charge is performed via the first switching element 17a. Or, the first interconnect 16a may be a scanning line (a gate line). A signal that controls the operation of the first switching element 17a is input to the scanning line.

The second switching element 17b (e.g., a transistor, a nonlinear resistance element, etc.) is provided between the first substrate 10s and the liquid crystal layer 30. The second switching element 17b is electrically connected to the second pixel electrode 12.

The second interconnect 16b is provided between the first substrate 10s and the liquid crystal layer 30. The second interconnect 16b is electrically connected to the second switching element 17b. For example, the second interconnect 16b is, for example, a signal line or a scanning line (a gate line).

The insulating layer 18 is provided between the first interconnect 16a and the first pixel electrode 11. The insulating layer 18 is further provided between the second interconnect 16b and the second pixel electrode 12.

At least a portion of the first interconnect 16a is positioned between the first pixel electrode 11 and the first substrate 10s. At least a portion of the second interconnect 16b is positioned between the second pixel electrode 12 and the first substrate 10s.

In the first substrate unit 10u, the interconnect 16 (and the switching element) are covered with the insulating layer 18. The pixel electrodes 10e are provided on the insulating layer 18. The interconnect 16 and the pixel electrodes 10e are insulated from each other by the insulating layer 18. Thereby, the surface area ratio of the pixel electrodes 10e can be increased. Thereby, the brightness of the display can be improved. A high contrast ratio is obtained.

In the embodiment, the light (the first light L1, the second light L2, the third light L3, the fourth light L4, etc.) includes visible light. The wavelength of visible light is, for example, not less than 380 nanometers (nm) and not more than 700 nm.

In the embodiment, the first substrate 10s and the second substrate 20s include glass substrates or resin substrates.

The opposing electrode 21 includes, for example, a conductive material that is light-transmissive. The opposing electrode 21 includes, for example, an oxide including at least one element selected from the group consisting of In, Sn, Zn, and Ti. The opposing electrode 21 includes, for example, ITO (Indium Tin Oxide), etc. The opposing electrode 21 may include, for example, a thin metal layer that is light-transmissive.

The opposing electrode 21 is light-transmissive. The transmittance is higher than the reflectance for the members (the first substrate 10s, the second substrate 20s, the opposing electrode 21, etc.) that are light-transmissive. The transmittance is higher than the absorptance for the members that are light-transmissive.

The pixel electrodes 10e include, for example, aluminum, etc. The pixel electrodes 10e are light-reflective. The reflectance is higher than the transmittance for the members (the pixel electrodes 10e) that are light-reflective. For example, the reflectance is higher than the absorptance for the members that are light-reflective.

For example, the pixel electrodes 10e (the first pixel electrode 11, the second pixel electrode 12, etc.) have specular reflectivity. For example, the polarization characteristics of the light that is incident on and reflected by the pixel electrodes 10e substantially are not changed by the reflection. For example, in the case where the pixel electrodes 10e have high diffuse reflectivity, the polarization characteristics of the reflected light may be different from the polarization characteristics of the incident light. For example, the contrast ratio of the display may decrease in the case where the polarities degrade due to the reflection. In the case where the pixel electrodes 10e have specular reflectivity, a high contrast ratio is obtained easily.

The front surfaces of the pixel electrodes 10e are relatively flat. Thereby, specular reflectivity is obtained easily.

The first substrate unit 10u and the second substrate unit 20u may further include alignment films (not shown). For example, the alignment films cover the pixel electrodes 10e and the opposing electrode 21. The alignment films align the liquid crystal of the liquid crystal layer 30. The alignment films include, for example, organic films such as polyimide, etc. The alignment of the liquid crystal layer 30 is determined by the characteristics (e.g., the anisotropy) of the alignment films. For example, rubbing of the alignment films is performed. Anisotropy may be provided in the alignment films by, for example, photo-alignment processing, etc.

The liquid crystal layer 30 includes, for example, a nematic liquid crystal. The liquid crystal layer 30 may include a chiral agent. A thickness tLC of the liquid crystal layer 30 is, for example, the distance along the Z-axis direction between the alignment film that covers the pixel electrodes 10e and the alignment film that covers the opposing electrode 21.

The liquid crystal layer 30 includes a first portion LCa, a second portion LCb, and a third portion LCc. The second portion LCb is disposed between the opposing electrode 21 and the first portion LCa. The third portion LCc is disposed between the first portion LCa and the second portion LCb. The first portion LCa is the portion of the liquid crystal layer 30 on the first substrate unit 10u side. The second portion LCb is the portion of the liquid crystal layer 30 on the second substrate unit 20u side. The third portion LCc is the central portion.

For example, the dielectric anisotropy of the liquid crystal layer 30 may be positive or negative. To simplify the description hereinbelow, an example will be described in which the dielectric anisotropy of the liquid crystal layer 30 is positive.

For example, when a voltage is not applied to the liquid crystal layer 30 (the initial state), the long-axis direction 35D of the liquid crystal 35 is substantially aligned with the X-Y plane. For example, the pretilt angle (the angle between the long-axis direction 35D and the X-Y plane) of the liquid crystal 35 is 10 degrees or less, e.g., about 5 degrees. When the voltage is applied to the liquid crystal layer 30, the tilt angle of the liquid crystal becomes large. When applying the voltage, for example, the tilt angle is about 90 degrees at the third portion LCc of the liquid crystal layer 30. When the dielectric anisotropy of the liquid crystal layer 30 is negative, the pretilt angle is, for example, not less than 70 degrees and not more than 90 degrees. The pretilt angle is arbitrary in the embodiment.

At the first portion LCa, the alignment direction (the long-axis direction 35D (the liquid crystal director direction)) of the liquid crystal is determined by, for example, the alignment processing direction (e.g., the rubbing direction) of the alignment film of the first substrate unit 10u. At the second portion LCb, the alignment processing direction (the long-axis direction 35D (the liquid crystal director direction)) of the liquid crystal is determined by, for example, the alignment direction (e.g., the rubbing direction) of the alignment film of the second substrate unit 20u.

For example, information relating to the alignment processing direction (e.g., the rubbing direction) of the alignment film is obtained by analyzing the alignment film using polarized light. For example, information relating to the alignment processing direction of the alignment film is obtained by observing the nonuniformity (e.g., rubbing scratches, etc.) of the alignment processing. There are cases where lines based on the nonuniformity of the alignment processing are easy to view when, for example, a voltage including direct current is applied between the opposing electrode 21 and the pixel electrodes 10e. The alignment processing direction (and the long-axis direction 35D) can be determined based on the lines.

For example, the alignment direction (the long-axis direction 35D) of the liquid crystal at the first portion LCa is determined by determining the alignment processing direction of the first substrate unit 10u. The alignment direction of the liquid crystal at the first portion LCa is aligned with the alignment processing direction of the first substrate unit 10u. Similarly, for example, the alignment direction (the long-axis direction 35D) of the liquid crystal at the second portion LCb is determined by determining the alignment processing direction of the second substrate unit 20u. In other words, the alignment direction of the liquid crystal at the second portion LCb is aligned with the alignment processing direction of the second substrate unit 20u.

The interconnects 16 (the first interconnect 16a and the second interconnect 16b) that are provided in the first substrate unit 10u include, for example, metal films.

The semiconductor layer that is included in the first switching element 17a and the second switching element 17b includes, for example, polysilicon, amorphous silicon, or an oxide semiconductor. The oxide semiconductor includes, for example, an oxide including at least one of indium (In), gallium (Ga), or zinc (Zn).

The insulating layer 18 may include, for example, a resin material. For example, at least one of an acrylic resin or a polyimide resin is used as the resin material. The insulating layer 18 may be light-absorbing. Thereby, for example, the transmission of the light in the inter-pixel region 15 is suppressed. On the other hand, in the case where the light-transmissivity of the insulating layer 18 is high, high patterning precision of the insulating layer 18 is obtained easily. The insulating layer 18 may include a stacked film of a resin layer and an inorganic layer. For example, at least one of silicon nitride, silicon oxynitride, or silicon oxide is used as the inorganic layer.

The polarizing layer 52 includes a polarizing film, a polarizing plate, etc. For example, the polarizing layer 52 may include an adhesive layer. The polarizing layer 52 is fixed to the second substrate unit 20u by the adhesive layer.

Figure 2A:
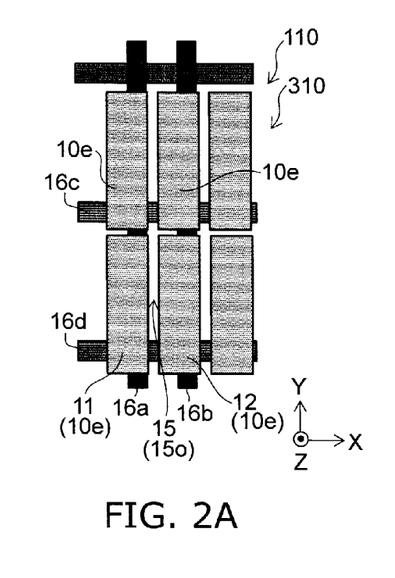
FIG. 2A and FIG. 2B are schematic plan views illustrating another liquid crystal display device according to the first embodiment.
Figure 2B:
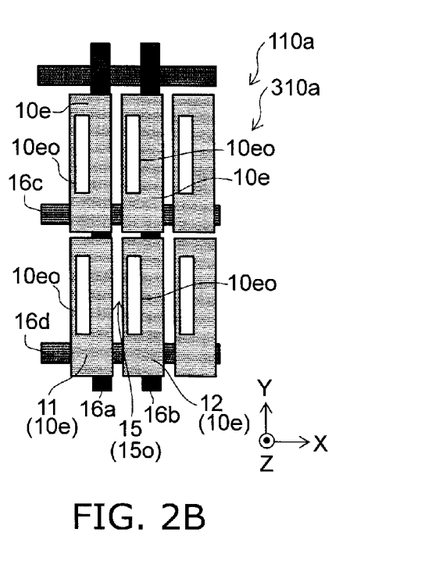

FIG. 2A and FIG. 2B are schematic plan views illustrating another liquid crystal display device according to the first embodiment.

These drawings illustrate the interconnects and the pixel electrodes 10e.

As shown in FIG. 2A, the first interconnect 16a and the second interconnect 16b are provided in the liquid crystal display device 110 and the electronic device 310. The first interconnect 16a and the second interconnect 16b are, for example, signal lines. A third interconnect 16c and a fourth interconnect 16d are further provided in the liquid crystal display device 110. The third interconnect 16c and the fourth interconnect 16d intersect the first interconnect 16a and the second interconnect 16b. The third interconnect 16c and the fourth interconnect 16d are, for example, gate lines. The inter-pixel region 15 (the opening region 15o) is provided between the multiple pixel electrodes 10e.

In a liquid crystal display device 110a and an electronic device 310a according to the embodiment as shown in FIG. 2B, openings 10eo are provided in the pixel electrodes 10e. In other words, the first pixel electrode 11 has the opening 10eo; and the opening region 15o includes the opening 10eo. The second pixel electrode 12 has the opening 10eo; and the opening region 15o includes the opening 10eo.

The opening region 15o includes at least one of the inter-pixel region 15 or the opening 10eo. The first light L1 passes through such an opening region 15o.

Figure 3:
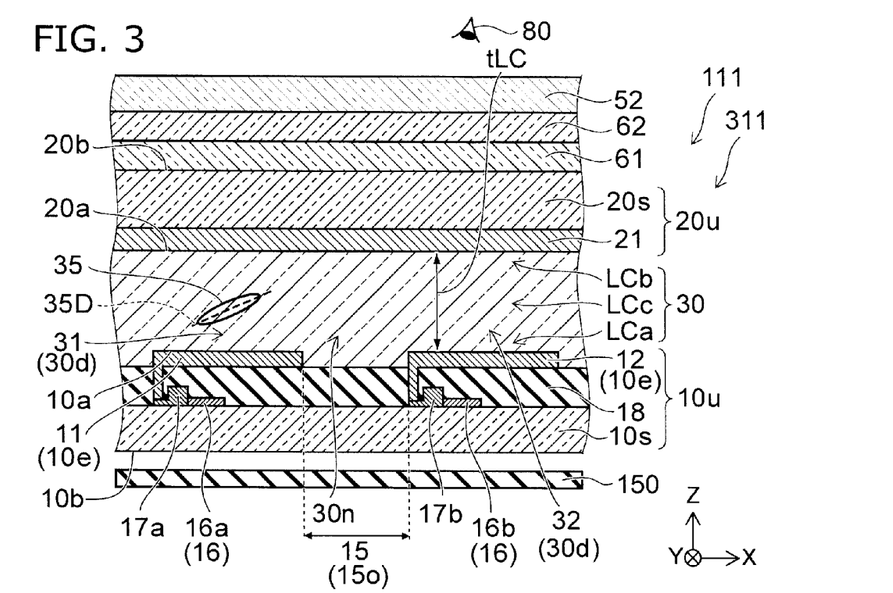
FIG. 3 is a schematic cross-sectional view illustrating another liquid crystal display device according to the first embodiment.

FIG. 3 is a schematic cross-sectional view illustrating another liquid crystal display device according to the first embodiment.

As shown in FIG. 3, a first phase difference layer 61 and a second phase difference layer 62 are further provided in the liquid crystal display device 111 (and the electronic device 311) according to the embodiment. Otherwise, the liquid crystal display device 111 is similar to the liquid crystal display device 110; and a description is omitted.

The first phase difference layer 61 is disposed between the liquid crystal layer 30 and the polarizing layer 52. In the example, the first phase difference layer 61 is disposed between the second substrate 20s and the polarizing layer 52. The second phase difference layer 62 is disposed between the liquid crystal layer 30 and the polarizing layer 52. In the example, the second phase difference layer 62 is disposed between the first phase difference layer 61 and the polarizing layer 52. The first phase difference layer 61 and the second phase difference layer 62 may be considered to be a portion of the second substrate unit 20u. The first phase difference layer 61, the second phase difference layer 62, and the second substrate unit 20u may be separate entities.

For example, a quarter-wave plate is used as the first phase difference layer 61. The retardation of the first phase difference layer 61 is, for example, not less than 100 nanometers and not more than 150 nanometers.

For example, a half-wave plate is used as the second phase difference layer 62. The retardation of the second phase difference layer 62 is, for example, not less than 240 nanometers and not more than 290 nanometers.

For example, the first phase difference layer 61 and the second phase difference layer 62 include stretched films, etc. For the phase difference layers, the product of the birefringence of the phase difference layer and the thickness of the phase difference layer corresponds to the retardation. The retardation can be determined by analysis using polarized light.

For example, the first phase difference layer 61 substantially changes the linearly polarized light that is incident into circularly polarized light. For example, the second phase difference layer 62 changes the polarization direction of the linearly polarized light that is incident 90 degrees.

By using these phase difference layers, the change of the optical characteristics (e.g., the effective birefringence) of the liquid crystal layer 30 can be efficiently changed into a change of the brightness of the light. In other words, the brightness is increased; and a high contrast ratio is obtained. The wavelength dependence becomes small.

In the embodiment, these phase difference layers may be provided as necessary and may be omitted. By using the first phase difference layer 61, for example, a high brightness and a high contrast ratio are obtained easily. By using the second phase difference layer 62, for example, the wavelength dependence of the optical characteristics is improved, e.g., coloring is suppressed.

In the embodiment, a first alignment angle is the angle between the X-axis direction and the alignment direction at the first portion LCa of the liquid crystal layer 30. For example, the first alignment angle is not less than 85 degrees and not more than 95 degrees. In the example, the first alignment angle is about 90 degrees.

A second alignment angle is the angle between the X-axis direction and the alignment direction at the second portion LCb of the liquid crystal layer 30. For example, the second alignment angle is not more than −140 degrees and not less than −180 degrees. In the example, the second alignment angle is about −160 degrees.

The absolute value of the angle (the twist angle) between the first alignment direction and the second alignment direction is not less than about 60 degrees and not more than about 80 degrees. In the example, the twist angle is 70 degrees. The twist angle corresponds to the twist angle of the long-axis direction 35D of the liquid crystal 35 inside the liquid crystal layer 30.

When the voltage is not applied to the liquid crystal layer 30, the retardation is, for example, not less than 180 nm and not more than 260 nm (the pretilt angle is small and can be ignored). In other words, the product of the thickness tLC (nm) of the liquid crystal layer 30 and the refractive index anisotropy of the liquid crystal included in the liquid crystal layer 30 is not less than 180 nanometers and not more than 260 nanometers.

A first phase difference angle between the slow axis of the first phase difference layer 61 and the X-axis direction is, for example, not less than 20 degrees and not more than 40 degrees. In the example, the first phase difference angle is 28.5 degrees.

A second phase difference angle between the slow axis of the second phase difference layer 62 and the X-axis direction is, for example, not less than 85 degrees and not more than 105 degrees. In the example, the second phase difference angle is 93.5 degrees.

Second Embodiment

Figure 4:
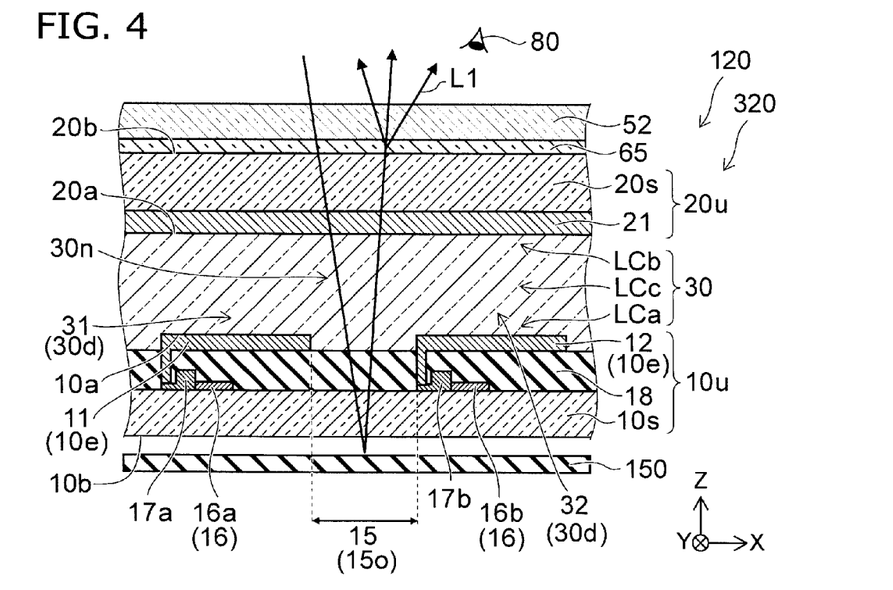
FIG. 4 is a schematic cross-sectional view illustrating a liquid crystal display device according to a second embodiment.

FIG. 4 is a schematic cross-sectional view illustrating a liquid crystal display device according to a second embodiment.

As shown in FIG. 4, an optical layer 65 is further provided in the liquid crystal display device 120 (and the electronic device 320) according to the embodiment. The optical layer 65 is provided between the polarizing layer 52 and the opposing electrode 21. Otherwise, the liquid crystal display device 120 is similar to the liquid crystal display device 110; and a description is omitted.

The optical layer 65 may be considered to be a portion of the second substrate unit 20u. The optical layer 65 and the second substrate unit 20u may be separate entities.

The optical layer 65 modifies the travel direction of the light that is incident on the optical layer 65. For example, the optical layer 65 diffuses (e.g., scatters) the light that is incident on the optical layer 65. For example, the optical layer 65 changes the intensity of the diffuse light (e.g., the scattered light) of the light that is incident on the optical layer 65 according to the direction (the direction in the X-Y plane) of the light that is incident on the optical layer 65. Examples of the configuration and characteristics of the optical layer 65 are described below.

The polarization characteristics of the light that is incident are substantially maintained in the optical layer 65. By using the optical layer 65, the reflection of images at the pixel electrodes 10e is suppressed even in the case where the pixel electrodes 10e have a relatively high specular reflectivity; and an easily-viewable display is possible.

The haze of the optical layer 65 is, for example, not less than 70% and not more than 95%. Thereby, good scattering properties are obtained; and a display having a good contrast ratio can be provided.

FIG. 5A to FIG. 5D are schematic views illustrating a portion of the liquid crystal display device according to the second embodiment.

Figure 5A:
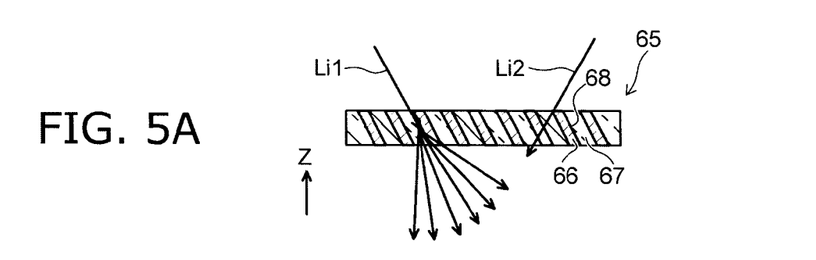
FIG. 5A to FIG. 5D are schematic views illustrating a portion of the liquid crystal display device according to the second embodiment.
Figure 5B:
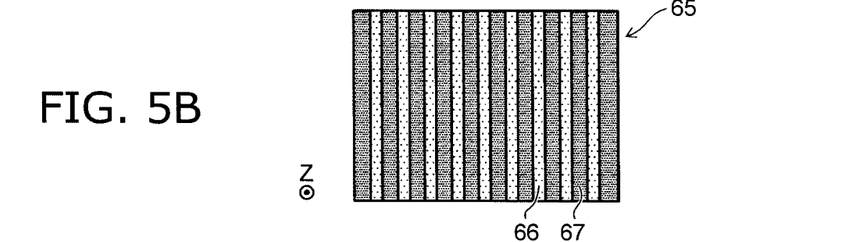
Figure 5C:
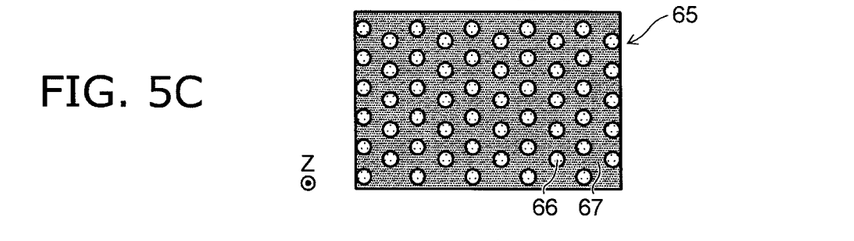
Figure 5D:
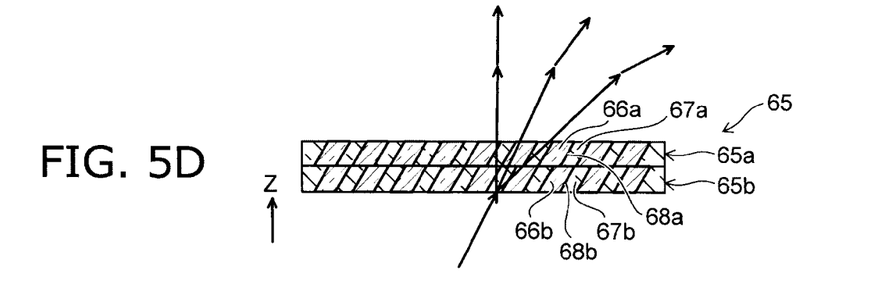

These drawings illustrate the optical layer 65. FIG. 5A is a schematic cross-sectional view illustrating the optical layer 65. FIG. 5B is a schematic plan view illustrating the optical layer 65. FIG. 5C is a schematic plan view showing the optical layer 65 of another example. FIG. 5D is a schematic cross-sectional view showing another example of the optical layer 65.

As illustrated in FIG. 5A, the optical layer 65 includes multiple first optical units 66 and a second optical unit 67.

The multiple first optical units 66 are disposed in the X-Y plane (in a plane parallel to the first surface 10*a*). The multiple first optical units 66 are light-transmissive. The second optical unit 67 is provided between any two of the multiple first optical units 66. The second optical unit 67 also is light-transmissive. In the example, multiple second optical units 67 are provided. The multiple first optical units 66 and the multiple second optical units 67 are disposed alternately. For example, a boundary 68 between the second optical unit 67 and at least one of the multiple first optical units 66 is tilted with respect to the X-Y plane. The refractive index of the second optical units 67 is higher or lower than the refractive index of the first optical units 66.

For example, the intensity of scattered light of the optical layer 65 for the light (a first incident light Li1) incident on the optical layer 65 from a first incident direction is different from the intensity of scattered light of the optical layer 65 for the light (a second incident light Li2) incident on the optical layer 65 from a second incident direction. Here, the direction of the first incident direction in the X-Y plane is different from the direction of the second incident direction in the X-Y plane.

For example, the intensity of scattered light of the optical layer 65 for the first incident light Li1 is higher than the intensity of scattered light of the optical layer 65 for the second incident light Li2. For example, the first incident light Li1 is scattered and diffused by the optical layer 65. On the other hand, for the second incident light Li2, the level of the scattering (the diffusion) of the optical layer 65 is low; and the transmissivity is high. Such scattering characteristics are obtained by, for example, the boundary 68 being tilted with respect to the X-Y plane. The optical layer 65 is, for example, an anisotropic scattering layer. The optical layer 65 is an anisotropic forward scattering film.

For example, a region having a high refractive index and a region having a low refractive index are provided in the optical layer 65. The optical layer 65 is, for example, a transparent film. For example, the level of the scattering of the optical layer 65 is different between the incident directions of the light. The optical layer 65 has a "scattering central axis." The scattering central axis corresponds to, for example, the optical axis of the first incident light Li1 illustrated in FIG. 5A. The scattering central axis corresponds to, for example, the incident direction of the light that scatters most.

As illustrated in FIG. 5B, the multiple first optical units 66 have band configurations. For example, the first optical units 66 and the second optical units 67 extend along one direction intersecting (e.g., orthogonal to) the Z-axis direction. In the example, the optical layer 65 is, for example, a louver structure-type.

In the example illustrated in FIG. 5C, the multiple first optical units 66 have island configurations that are separated from each other. In the example, the optical layer 65 is, for example, a columnar structure-type.

In the example illustrated in FIG. 5D, the optical layer 65 includes multiple layers (a first layer 65*a*, a second layer 65*b*, etc.). These layers are stacked along the Z-axis direction. The first layer 65*a* includes multiple first optical units 66*a* that are light-transmissive and disposed in the X-Y plane, and a second optical unit 67*a* that is light-transmissive and provided between two of the multiple first optical units 66*a*. The refractive index of the second optical unit 67*a* is different from the refractive index of the multiple first optical units 66*a*. In such a case as well, a boundary 68*a* that is between the second optical unit 67*a* and at least one of the multiple first optical units 66*a* is tilted with respect to the X-Y plane.

The second layer 65*b* includes multiple third optical units 66*b* that are light-transmissive and disposed in the X-Y plane, and a fourth optical unit 67*b* that is light-transmissive and provided between two of the multiple third optical units 66*b*. The refractive index of the fourth optical unit 67*b* is different from the refractive index of the multiple third optical units 66*b*. A boundary 68*b* that is between the fourth optical unit 67*b* and at least one of the multiple third optical units 66*b* is tilted with respect to the X-Y plane. For example, the extension direction of the boundary 68*b* is aligned with the extension direction of the boundary 68*a*. For example, the angle between the plane including the boundary 68*a* and the plane including the boundary 68*b* may be 30 degrees or less. For example, the scattering area is enlarged by providing multiple layers in the optical layer 65. By providing multiple layers in the optical layer 65, the coloration (e.g., the occurrence of rainbow colors), etc., can be suppressed. The number of layers provided in the optical layer 65 may be three or more.

Figure 6A:
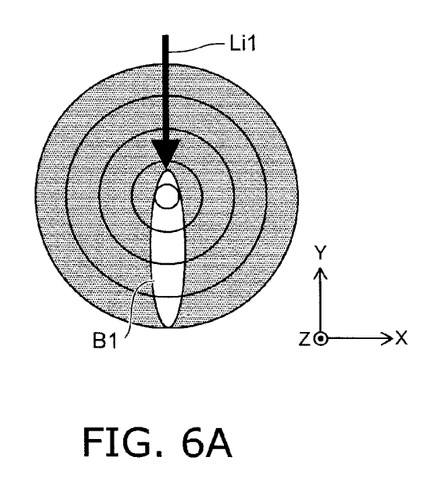
FIG. 6A and FIG. 6B are schematic plan views illustrating characteristics of the liquid crystal display device according to the second embodiment.
Figure 6B:
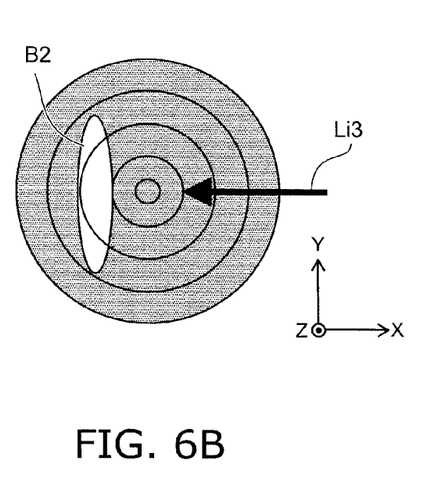

FIG. 6A and FIG. 6B are schematic plan views illustrating characteristics of the liquid crystal display device according to the second embodiment.

These drawings are schematic views illustrating characteristics of the optical layer 65 and schematically illustrate the intensity of light passing through the optical layer 65 when the light is incident on the optical layer 65. FIG. 6A corresponds to when the first incident light Li1 is incident. In the example, the first incident light Li1 is incident on the optical layer 65 along the Y-Z plane. The incident angle of the first incident light Li1 (the angle between the Z-axis direction and the first incident light Li1) is 30 degrees. FIG. 6A corresponds to the case where, for example, the light is incident from a direction parallel to the scattering central axis. FIG. 6B corresponds to when a third incident light Li3 is incident. In the example, the third incident light Li3 is incident on the optical layer 65 along the X-Z plane. The incident angle of the third incident light Li3 (the angle between the Z-axis direction and the third incident light Li3) is 30 degrees. FIG. 6B corresponds to, for example, the case where the light is incident from a direction perpendicular to the scattering central axis.

The concentric circles shown in these drawings correspond to angles (equiangular lines) having the Z-axis direction as the reference. The center of the concentric circles corresponds to the transmitted light (the perpendicularly-emitted light) being emitted from the optical layer 65 substantially along the Z-axis direction. Bright regions B1 and B2 that are shown in these drawings are regions where the intensity of the transmitted light is high.

As shown in FIG. 6A, for example, the intensity of the perpendicularly-emitted light is high for the first incident light Li1 along the Y-axis direction. The intensity of the transmitted light emitted in the direction tilted in the Y-Z plane also is high.

As shown in FIG. 6B, for example, the intensity of the perpendicularly-emitted light is low for the third incident light Li3 along the X-axis direction. The intensity of the transmitted light in the direction tilted in the X-Z plane (the direction tilted from the perpendicular direction) is high.

Thus, in the optical layer 65, the intensity of the light of the optical layer 65 for the light (e.g., the first incident light Li1) incident on the optical layer 65 from the first incident direction is different from the intensity of the light of the optical layer 65 for the light (the second incident light Li2, the third incident light Li3, etc.) incident on the optical layer 65 from the second incident direction. The optical layer 65 is, for example, a light control film.

As illustrated in FIG. 4, the travel direction of the light changes at the optical layer 65. By providing the optical layer 65, the light from the back surface can efficiently pass through the display unit (the first substrate unit 10u, the liquid crystal layer 30, the second substrate unit 20u, and the polarizing layer 52). The viewing of an object (the structural body 150) on the backside of the panel becomes easy.

Third Embodiment

Figure 7A:
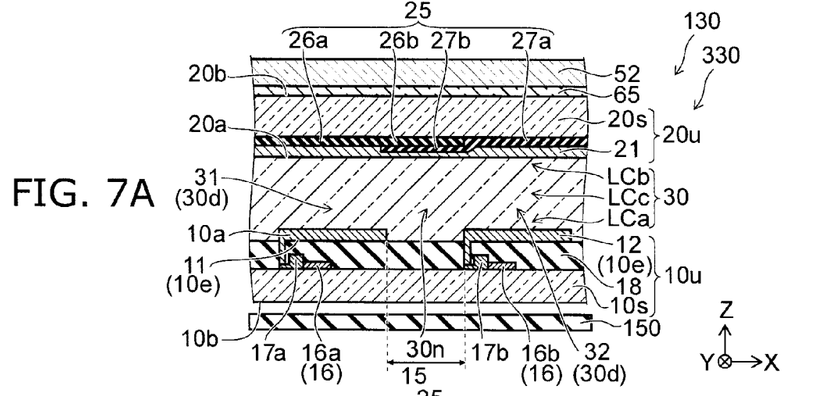
FIG. 7A to FIG. 7C are schematic cross-sectional views illustrating liquid crystal display devices according to a third embodiment.
Figure 7B:
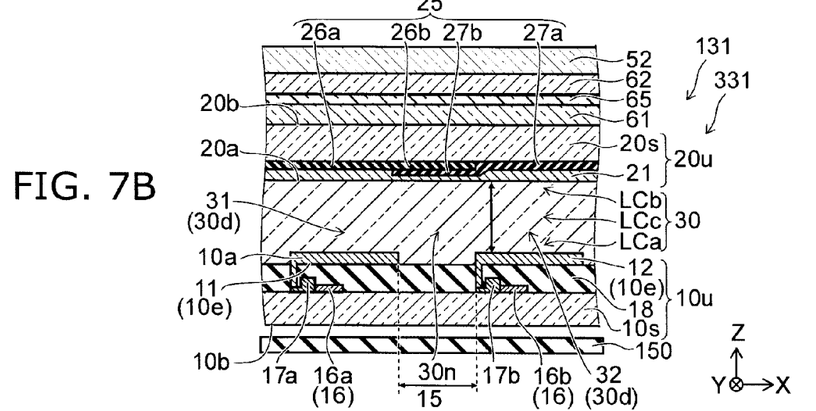
Figure 7C:
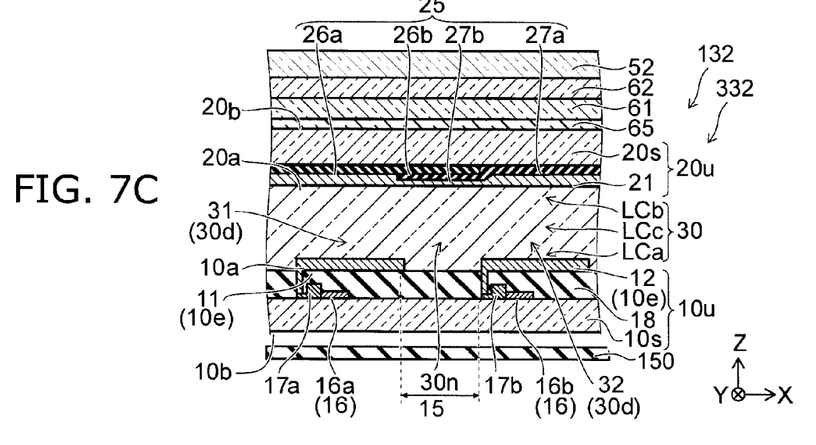

FIG. 7A to FIG. 7C are schematic cross-sectional views illustrating liquid crystal display devices according to a third embodiment.

In a liquid crystal display device 130 (and an electronic device 330) according to the embodiment as shown in FIG. 7A, a colored layer 25 is further provided in the second substrate unit 20u. The opposing electrode 21 is disposed between the colored layer 25 and the liquid crystal layer 30. A planarization layer (an overcoat layer) may be provided between the colored layer 25 and the opposing electrode 21. Otherwise, the liquid crystal display device 130 is similar to the liquid crystal display device 120; and a description is omitted.

In the example, the colored layer 25 includes a first colored portion 26b and a second colored portion 27b. The first colored portion 26b overlaps the inter-pixel region 15 when projected onto the first surface 10a (or the X-Y plane). The first colored portion 26b has a first color. In the example, the second colored portion 27b overlaps the inter-pixel region 15 and the first colored portion 26b when projected onto the first surface 10a (or the X-Y plane). The second colored portion 27b has a second color that is different from the first color.

For example, one of the first color or the second color is red; and the other is blue. One of the first color or the second color may be red; and the other may be green. One of the first color or the second color may be blue; and the other may be green.

For example, one of the first color or the second color is magenta; and the other is cyan. One of the first color or the second color may be magenta; and the other may be yellow. One of the first color or the second color may be cyan; and the other may be yellow.

In the example, the first colored portion 26b and the second colored portion 27b overlap the inter-pixel region 15. The first colored portion 26b and the second colored portion 27b may not overlap the inter-pixel region 15.

In the example, the colored layer 25 further includes a first color filter 26a and a second color filter 27a. The first color filter 26a is provided between the first pixel electrode 11 and the polarizing layer 52. The first color filter 26a has, for example, the first color recited above.

The second color filter 27a is provided between the second pixel electrode 12 and the polarizing layer 52. The second color filter 27a has a third color that is different from the first color. The third color may be the same as or different from the second color.

The first colored portion 26b may be continuous with or separated from the first color filter 26a. The second colored portion 27b may be continuous with or separated from the second color filter 27a.

As shown in FIG. 7B and FIG. 7C, the colored layer 25 is provided in liquid crystal display devices 131 and 132 (and electronic devices 331 and 332) according to the embodiment.

According to the embodiment, a liquid crystal display device and an electronic device that have high designability can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the interconnect, the switch element, the display layer, the insulating layer, the drive unit, the switch, the selector, the circuit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

Those skilled in the art can suitably modify the above embodiments by addition, deletion, or design change of components, or by addition, omission, or condition change of processes, and such modifications are also encompassed within the scope of the invention as long as they fall within the spirit of the invention.

Other operations produced from aspects described in the embodiment, the operations being clear from the specification and appropriately obtainable by a person skilled in the art, are considered to be naturally produced from the invention.

What is claimed is:

1. A liquid crystal display device comprising:
   a first substrate including a first pixel electrode being light-reflective, a second pixel electrode being light-reflective, and a light-transmissive opening region between the first pixel electrode and the second pixel electrode;
   a second substrate including an opposing electrode being light-transmissive, the opposing electrode being arranged on a second surface of the second substrate;
   a polarizing layer arranged on a first surface of the second substrate; and
   a liquid crystal layer provided between a first surface of the first substrate and the second surface of the second substrate,
   wherein the light-transmissive opening region between the first pixel electrode and the second pixel electrode transmits a light that is received from a second surface of the first substrate and that propagates to an outside surface of the polarizing layer when voltage is not applied to the liquid crystal layer.

2. The liquid crystal display device according to claim 1, wherein the first pixel electrode and the second pixel electrode each have specular reflectivity.

3. The liquid crystal display device according to claim 2, wherein the first pixel electrode and the second pixel electrode each have a light-transmissive opening.

4. The liquid crystal display device according to claim 3, further comprising color filters on the second substrate, wherein one color filter faces the first pixel electrode and another color filter faces the second pixel electrode, and the color filters are overlapped with each other over the light-transmissive opening region.

5. The liquid crystal display device according to claim 1, further comprising a quarter-wave plate located over the second substrate and a half-wave plate located between the quarter-wave plate and the polarizing layer, wherein the retardation of the quarter-wave plate is not less than 100 nm and not more than 150 nm, and the retardation of the half-wave plate is not less than 240 nm and not more than 290 nm.

6. The liquid crystal display device according to claim 5, wherein the retardation of the liquid crystal layer is not less than 180 nm and not more than 260 nm when the voltage is not applied to the liquid crystal layer.

7. The liquid crystal display device according to claim 2, further comprising an optical layer located between the second substrate and the polarizing layer, wherein a haze of the optical layer is not less than 70% and not more than 95% and the optical layer scatters the light that is received from the second surface of the first substrate.

8. The liquid crystal display device according to claim 2, further comprising an optical layer located between the second substrate and the polarizing layer, wherein the optical layer has a region having a high refractive index and a region having a low refractive index.

9. A liquid crystal display device comprising:
a first substrate including
a first wiring line and a second wiring line extending in the first direction and a third wiring line and a fourth wiring line extending in the second direction,
a portion of the first substrate that is surrounded by the first, second, third, and fourth wiring lines forming a pixel region, and
a light-reflective pixel electrode overlapping the first wiring line, the third wiring line, and less than all of the pixel region,
a second substrate including a light transmissive opposing electrode;
a polarizing layer arranged only on the second substrate and no polarizing layer being arranged on the first substrate; and
a liquid crystal layer provided between the first substrate and the second substrate,
wherein the second substrate includes color filters, one of the color filters faces the light-reflective pixel electrode, and the one of the color filters is overlapped with another one of the color filters so that the light transmitted through the first and second substrates passes through only one polarizing layer.

10. The liquid crystal display device according to claim 9, wherein a light that is transmitted through the first and second substrates passes through only one polarizing layer, which is the singular polarizing layer.

11. The liquid crystal display device according to claim 10, wherein the light-reflective pixel electrode has specular reflectivity.

12. The liquid crystal display device according to claim 11, wherein the light-reflective pixel electrode has a light-transmissive opening.

13. The liquid crystal display device according to claim 11, further comprising a quarter-wave plate located over the second substrate and a half-wave plate located between the quarter-wave plate and the polarizing layer, wherein the retardation of the quarter-wave plate is not less than 100 nm and not more than 150 nm, and the retardation of the half-wave plate is not less than 240 nm and not more than 290 nm.

14. The liquid crystal display device according to claim 13, wherein the retardation of the liquid crystal layer is not less than 180 nm and not more than 260 nm when the voltage is not applied to the liquid crystal layer.

15. The liquid crystal display device according to claim 11, further comprising an optical layer located between the second substrate and the singular polarizing layer, wherein a haze of the optical layer is not less than 70% and not more than 95% and the optical layer scatters a light received from the liquid crystal layer.

16. The liquid crystal display device according to claim 11, further comprising an optical layer located between the second substrate and the singular polarizing layer, wherein the optical layer has a region having a high refractive index and a region having a low refractive index.

17. A liquid crystal display device, comprising:
a second substrate including an opposing electrode being light-transmissive;
a polarizing layer on the second substrate;
a first substrate including first and second reflective pixel electrodes that each reflects a polarized light received from the polarizing layer back to the polarizing layer, and a light-transmissive opening region between the first pixel electrode and the second pixel electrode that transmits an unpolarized light that is received from an outer side of the first substrate; and
a liquid crystal layer provided between the first substrate and the second substrate.

18. The liquid crystal display device according to claim 17, wherein the first and second reflective pixel electrodes each have specular reflectivity.

19. The liquid crystal display device according to claim 18, wherein the first and second reflective pixel electrodes have a light-transmissive opening.

20. The liquid crystal display device according to claim 19, further comprising color filters on the second substrate, wherein one color filter faces the first reflective pixel electrode and another color filter faces the second reflective pixel electrode, and the color filters are overlapped with each other over the light-transmissive opening region.

21. The liquid crystal display device according to claim 20, further comprising a quarter-wave plate located over the second substrate and a half-wave plate located between the quarter-wave plate and the polarizing layer, wherein the retardation of the quarter-wave plate is not less than 100 nm and not more than 150 nm, and the retardation of the half-wave plate is not less than 240 nm and not more than 290 nm.

22. The liquid crystal display device according to claim 21, wherein the retardation of the liquid crystal layer is not less than 180 nm and not more than 260 nm when the voltage is not applied to the liquid crystal layer.

23. The liquid crystal display device according to claim 20, further comprising an optical layer located between the second substrate and the polarizing layer,
wherein a haze of the optical layer is not less than 70% and not more than 95% and the optical layer scatters the polarized light received from the polarizing layer.

24. The liquid crystal display device according to claim 20, further comprising an optical layer located between the second substrate and the polarizing layer,
wherein the optical layer has a region having a high refractive index and a region having a low refractive index.

* * * * *